United States Patent

Asam

[15] 3,693,171

[45] Sept. 19, 1972

[54] FERROELECTRIC-PHOTOELECTRIC STORAGE UNIT

[72] Inventor: Adolf R. Asam, Northridge, Calif.

[73] Assignee: International Telephone and Telegraph Corporation, New York, N.Y.

[22] Filed: Dec. 30, 1970

[21] Appl. No.: 102,638

[52] U.S. Cl. ..........340/173 LS, 250/219, 340/173.2, 340/173 LM

[51] Int. Cl. ..........................G11c 13/04, G11c 11/22

[58] Field of Search ......340/173 LS, 173.2, 173 LM; 250/211, 219

[56] References Cited

UNITED STATES PATENTS

| | | | |
|---|---|---|---|
| 3,350,506 | 10/1967 | Chernow | 340/173.2 |
| 3,435,425 | 3/1969 | Hastings | 340/173 LS |
| 3,229,261 | 1/1966 | Fatuzzo | 340/173 LM |

*Primary Examiner*—Terrell W. Fears
*Attorney*—C. Cornell Remsen, Jr., Walter J. Baum, Paul W. Hemminger, Charles L. Johnson, Jr. and Thomas E. Kristofferson

[57] ABSTRACT

A solid state image storage unit comprising a layer of ferroelectric material having a first electrode formed on one side of the layer and second electrode formed on the other side of said layer. A photoconductive array is formed of a plurality of channels having a coating of photoconductive material, one end of the channels having a first conductive coating thereon defining a third electrode and the other end of the channels having a conductive coating thereon defining a fourth electrode with the second electrode being conductively connected to the third electrode. A unidirectional voltage is applied to the first and fourth electrodes, and light is projected onto the surface of the photoconductive channels, with the layer of ferroelectric material being polarized as a function of the light projecting onto the surface of said photoconductive channels.

4 Claims, 5 Drawing Figures

PATENTED SEP 19 1972 3,693,171

INVENTOR
ADOLF R. ASAM
BY
ATTORNEY

FERROELECTRIC-PHOTOELECTRIC STORAGE UNIT

The invention relates, in general, to solid state image transducers and, more particularly, to a system which incorporates an improved solid state transducer in a camera system.

BACKGROUND OF THE INVENTION

Prior art solid state camera apparatus and systems have utilized a transducer formed of a photoconductor-ferroelectric laminate sandwiched between a pair of electrode surfaces, one of the electrode surfaces being transparent. Analog storage of light is obtained by the local fractional change in the polarization of the ferroelectric film. The conversion from an optical image to an electric charge pattern is accomplished by the photoconductive layer. Application of a positive pulse to the electrodes results in a local photocurrent proportional to the light intensity. By reversing the polarity of the voltage across the electrodes and scanning the ferroelectric film with a pencil beam of light via the photoconductor, the stored information can be retrieved.

Prior art solid state image transducers utilizing a photoconductor-ferroelectric laminate have not been previously successful because of the incompatibility in voltage requirements between the photoconductor and the ferroelectric layers. This incompatibility has been evidenced by a voltage breakdown of the photoconductor when polarization of the ferroelectric layer was attempted during both the storage and retrieval operation. To overcome the voltage incompatibility, it has been necessary to utilize a thin film ferroelectric material of several microns thickness in order to reduce the switching or coersive voltage (voltage necessary to reverse polarization) to a low enough value where voltage breakdown of the photoconductive material can be avoided. However, it has not been possible to produce a ferroelectric material in either thin film form or as a single crystal over large areas of a micron thickness in order to be useful as a storage device or image transducing device.

In order to overcome the attendant disadvantages of prior art solid state image transducers, the present invention provides a solid state image transducer composed of both a photoconductor deposited onto the channel walls of a multi-channel array and a ferroelectric material wherein the voltage breakdown of the photoconductor is overcome. By operating the photoconductor of the transducer in the surface mode rather than in the volume mode, it has been found that compatibility between the photoconductor and the ferroelectric material is sufficient to avoid voltage breakdown of the photoconductor when the ferroelectric material is switched.

The advantages of this invention, both as to its construction and mode of operation will be readily appreciated as the same becomes a better understood by reference to the following detailed description when considered in connection with the accompanying drawings in which like reference numerals designate like parts throughout the figures.

DESCRIPTION OF THE PREFERRED EMBODIMENT

Figure 1:
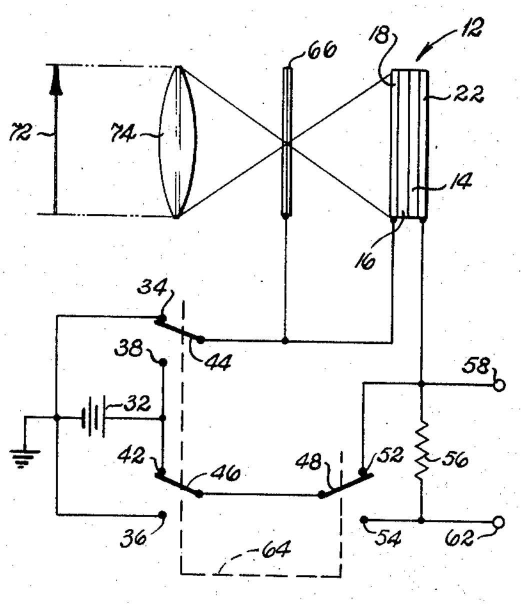
FIG. 1 depicts a schematic representation of a solid state camera system incorporating a transducer in accordance with the invention operated in a first mode of operation.

Referring now to FIG. 1, there is shown the schematic representation of a conventional electronic camera system. Such a system is described in greater detail in U. S. Pat. No. 3,083,062. The system is composed of a photoconductive storage device 12 wherein a visual or infrared image which is to be converted into electrical signals is projected onto one surface of the device 12 and the image stored therein. The device 12 is composed of a layer 14 of ferroelectric material and a layer 16 of photoconductive material disposed in side-by-side relationship. The layers 14 and 16 are sandwiched between a pair of end electrodes 18, 22, the layer 18 being transparent.

A source of DC (direct-current) voltage 32 is connected across the electrodes 18 and 22 through a switching circuit. The switching circuit is formed of a first pair of terminals 34, 36 which are connected to a common terminal of the voltage source 32. The other side of the voltage source is connected to a second pair of terminals 38, 42. A first movable armature 44 is connected between the electrode 18 and alternately between the terminals 34 and 38, while a second movable armature 46 is connected alternately between the terminals 42 and 36 as well as directly to a third armature 48. The armature 48 is movable between a first terminal 52 and a second terminal 54. The terminal 52 is connected directly to the electrode 22 and the terminal 54 is connected to the electrode 22 through a resistor 56. Further, a pair of output terminals 58, 62 are connected across the output resistor 56.

A ganged switch shown as a dashed line 64 is connected to the armatures 44, 46 and 48 so that in a first position, as shown in FIG. 1, during the read-in mode, the armature 44 is connected to the terminal 34, the armature 46 connected to the terminal 42 and the armature 48 connected to the terminal 52. Moreover, it should be noted that the armature 44 is also directly connected to an electronic shutter 66, as will be explained hereinafter. Movement of the ganged switch 64 from the position shown in FIG. 1, causes the armature 44 to be connected to the terminal 38, the armature 46 to be connected to the terminal 36 and the armature 48 to be connected to the terminal 54.

During read-in when the image is converted into electrical signals, the light from an image 72 to be stored in device 12 and to be subsequently converted to an electrical signal, is focused by an optical system represented by a lens 74 through the shutter 66 onto the surface of the photoconductive layer 16 of the storage unit 12. The optical shutter 66 is positioned at the focal point of the light rays from the image 72 and is controlled by the ganged switch to pass or to interrupt the light rays.

Figure 2:
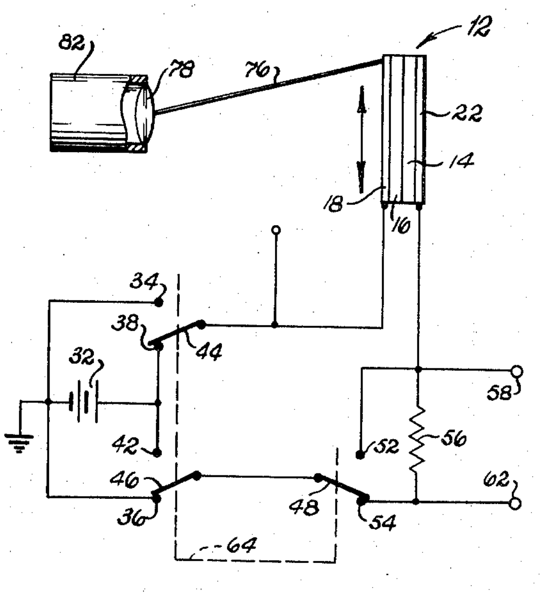
FIG. 2 shows a schematic representation of a solid state camera system of FIG. 1 operated in a second mode of operation.

The read-out function of the system is shown in FIG. 2. The energy stored in the ferroelectric layer 14 is retrieved by reversing the polarity of the voltage source 32 across the electrodes 18 and 22 as shown in FIG. 2, and by causing the photoconductive layer 16 through the transparent electrode 18 with a pencilbeam of light 76. An optical system, represented by a lens 78 serves to focus the light from a scanning system 82 onto the photoconductive layer 16. The scanning system is described in greater detail in the above mentioned patent and forms no part of the present invention.

The photoconductive layer 16 can be thought of as a variable resistor whose resistance is proportional to the intensity of the incident light. The ferroelectric material 14 performs a function similar to a capacitor in which a charge may be internally stored. The ferroelectric material will permanently memorize the quantity of stored charge in the form of internal polarizations. In the read-in operation, light impinging on photoconductor 16 will cause the photoconductive layer to become more conductive than in its dark state. During exposure, a voltage of first polarity is applied across the electrodes 18 and 22 by positioning the switch as in FIG. 1, causing current to flow through the photoconductive layer 16 and charge the ferroelectric layer 14. The fractional polarization of layer 18 is a function of photoconductor current and time duration of the read-in pulse applied to the device 12. For read-out purposes, it is necessary to lower the resistance of the photoconductive layer 16 by the scanning pencilbeam of light 76. Then, the application of an opposite voltage across the device 12 results in a current which discharges the stored charge in the ferroelectric layer 14.

Figures 3, 4, 5:
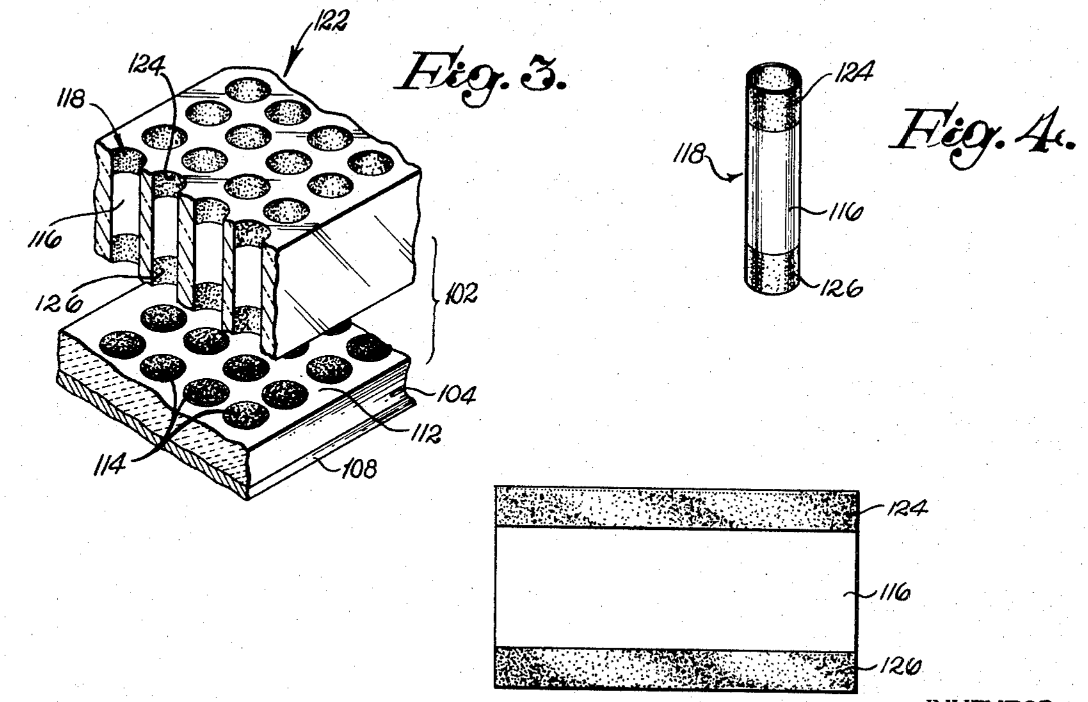
FIG. 3 illustrates a perspective view, partly in section, of a solid state image transducer made in accordance with the invention.
FIG. 4 shows a view, partially in section, of a portion of the transducer of FIG. 3.
FIG. 5 depicts, for explanation purposes, a portion of the transducer of FIG. 3 in separated form.

Referring now to FIG. 3, the photosensitive storage device 102 in accordance with the invention, is shown in greater detail. A layer of ferroelectric material 104 typically comprises a niobium doped lead titanate-zirconate ferroelectric ceramic or similar materials which is normally of three-fourths to 1 inch in diameter, although other sizes can be used, and has a thickness of approximately 2 to 3 mils. The bottom surface of the ferroelectric material is normally coated with a conductive material to form an electrode 108. The top surface 112 of the ferroelectric material is provided with dot electrodes as at 114 to form a conductive connection.

The photoconductor material 116 is deposited by chemical deposition or evaporation into channels 118 of a channel array 122 which is typically made of glass. The top and bottom portion of each channel is then coated with a conductive material 124, 126, respectively, which penetrates a minimum of one-half channel diameter into the channel. This conductive material is aligned with the dot electrodes 114 on the ferroelectric layer 104 so as to form a direct connection between the electrodes 114 and the conductive material 126. The conductive material 124, collectively forms an electrode on the storage device. By coating each of the channels 118 with a photoconductive material such as cadmium sulfide, cadmium selenide, or a mixture thereof, or lead sulfide, and then providing conductive material on both surfaces of the channel array, the photoconductor operates in the surface mode instead of the volume mode as was accomplished in the prior art. The length of the channels 118 are designed to obtain compatibility in voltage requirements between the photoconductive and ferroelectric material.

In FIG. 4 a typical channel is shown having electrodes 124, 126, the inner edge of which define the electrode gaps. To understand the operation of each channel 118, consider the member of FIG. 4 split open and then laid flat, as shown in FIG. 5. As can be readily seen, current flow through the device would be along the surface of the photoconductive material 116, between the electrodes 124 and 126. Thus, as can be readily seen, the device operates in a surface mode and, as such, problems relating to voltage breakdown of the photoconductor are overcome.

Typically, 60 volts is required to switch the state of polarization of the previously mentioned niobium doped lead titanate-zirconate ceramic ferroelectric material of three mil thickness. A photoconductor with an electrode gap 2 to 3 micron thickness operated in the volume mode could not sustain this voltage. However, a photoconductor with an electrode gap of 10 mils operating in the surface mode as shown in FIG. 3, can easily sustain this voltage. Therefore, a channel array approximately 12 to 20 mils thick is sufficient when operating in the surface mode.

Typically, the solid state image transducer could be constructed with a length-to-diameter ratio of 15 to 20. The array would be coated with a cadmium sulfide, cadmium selenide, a mixture of the two, or a lead sulfide photoconductor with the walls of each channel coated to approximately 1 to 2 microns thickness. Then, both sides of the array would be provided with a metallic electrode to provide an active electrode gap to 10 mils. Then the channel array 122 and the electroded ferroelectric material 104 are brought together and can be sandwiched between a pair of glassplates (not shown).

What is claimed is:

1. A solid state image storage unit comprising:

a layer of ferroelectric material having a first electrode means on one side of said layer and second electrode means on the other side of said layer, photoconductive means including a glass body positioned over said ferroelectric layer and having a plurality of channels therethrough, said channels each having a coating of photo-conductive material along the surface thereof, one end of said channels having a first conductive coating thereon defining a third electrode means and the other end of said channels having a con-ductive coating thereon defining a fourth electrode means, said second electrode means being conductively connected to said third electrode means, means for applying a unidirectional voltage across said first and fourth electrodes including said photoconductive means and ferroelectric layer connected in series therebetween, said voltage being applied across the length of photoconductive surface within said channels, and means for projecting light onto the sur-face of said photoconductive channels, said layer of ferroelectric material being polarized as a function of the light projecting onto the surface of said photoconductive channels.

2. A storage unit in accordance with claim 1 wherein said second electrodes are formed of a plurality of dots on said ferroelectric material, each of said dots being aligned with one of said channels of said photoconductive means and connected to said first conductive coating at said one end.

3. A storage unit in accordance with claim 1 and further comprising means for reversing the the direction which said unidirectional voltage is applied across said first and fourth electrodes.

4. A storage unit in accordance with claim 1 wherein said conductive coating forming said electrode in said channels penetrates a minimum of one-half channel diameter into said channel.

* * * * *